United States Patent [19]
Quantz

[11] 3,874,474
[45] Apr. 1, 1975

[54] METHOD AND APPARATUS FOR DETECTING THE UTILIZATION OF A VEHICLE SAFETY BELT

[75] Inventor: Norman G. Quantz, Algonac, Mich.
[73] Assignee: Lectron Products, Inc., Troy, Mich.
[22] Filed: Nov. 12, 1973
[21] Appl. No.: 414,867

[52] U.S. Cl. ....... 180/82 C, 280/150 SB, 307/10 SB, 340/52 E
[51] Int. Cl. ..... B60r 21/10, G08b 21/00, H02g 3/00
[58] Field of Search ............ 180/82 C; 280/150 SB; 200/DIG. 1; 307/10 SB; 340/52 E, 278

[56] References Cited
UNITED STATES PATENTS

| | | | |
|---|---|---|---|
| 2,031,226 | 2/1936 | Parvin | 200/DIG. 1 |
| 3,727,181 | 4/1973 | Robbins | 340/278 X |
| 3,732,538 | 5/1973 | Gillund | 307/10 SB X |
| 3,740,567 | 6/1973 | Atkins | 307/10 SB |
| 3,751,674 | 8/1973 | Holt | 180/82 C X |

Primary Examiner—David Schonberg
Assistant Examiner—Terrance L. Siemens
Attorney, Agent, or Firm—Harness, Dickey & Pierce

[57] ABSTRACT

An apparatus for detecting the proper utilization of a safety belt of a vehicle by a vehicle occupant which includes a high frequency oscillator and a sensing foil connected to the oscillator which is positioned in the seat of the vehicle. The oscillator is in a non-oscillating condition prior to the presence of the occupant in the seat, begins to oscillate when the occupant is positioned in the seat due to capacitive interaction between the occupant and the sensing foil in the seat, and stops oscillating upon buckling of the seat belt. Advantageously, the oscillator of the present apparatus has a power supply input impedance of large value so that the apparatus may be connected to the vehicle battery even when the ignition switch is turned off without detrimentally-high battery drain. Consequently, occupants who occupy the seat and fasten the safety belt prior to the closing of the ignition switch will be given credit for such action. This high power supply input impedance which results in low power drain is accomplished without sacrificing the efficiency and detection capability of the system and without sacrificing the protection of the system against voltage transients which may occur during periods of momentary heavy loads such as during the starting of the vehicle.

27 Claims, 2 Drawing Figures

PATENTED APR 1 1975  3,874,474

METHOD AND APPARATUS FOR DETECTING THE UTILIZATION OF A VEHICLE SAFETY BELT

CROSS REFERENCE TO THE RELATED APPLICATION

This application generally relates to seat belt utilization detectors as disclosed in my co-pending application for Method and Apparatus for Detecting the Utilization of a Vehicle Safety Belt, Ser. No. 150,088, filed June 4, 1971 now U.S. Pat. No. 3,806,867 issued Apr. 23, 1974 and assigned to the same assignee as the assignee of this application. The teachings of said co-pending application are incorporated herein by reference thereto.

BACKGROUND AND SUMMARY OF THE INVENTION

Various seat belt utilization detecting devices have been disclosed having a substantial number of mechanical switches which are operatively associated with the safety belt and the seat for indicating when the occupant is positioned in the seat and the safety belt is extended and connected. It will be appreciated that those of the above devices which are reasonably effective are necessarily complex due to the need for a large number of mechanical switches. The present invention provides a simplified method and apparatus for detecting the proper utilization of a safety belt by a vehicle occupant. More particularly, the present invention relates to a safety belt utilization detector which uses a foil or other conductor which is associated with the seat of the vehicle and which is connected to a circuit for detecting a change in the reactive impedance of the conductor upon occupation of the seat by the vehicle occupant. The circuit which detects the change in the reactive impedance of the seat conductor has an exceptionally high power supply input impedance so that the circuit may remain operative for long periods of time without excessive drain on the battery of the vehicle. Another feature of the present invention relates to the provision of an oscillator for detecting a change in the reactive impedance of the seat conductor which utilizes a transistor which is normally partially conducting prior to occupation of the seat by the vehicle occupant, is driven into oscillation upon occupation of the seat by the vehicle occupant, and is changed to a non-oscillating condition upon buckling of the safety belt. Preferably, the buckling of the safety belt shunts the oscillator output to ground to terminate a safety belt "unfastened" signal.

DETAILED DESCRIPTION OF THE PREFERRED EMBODIMENT

Figure 1:
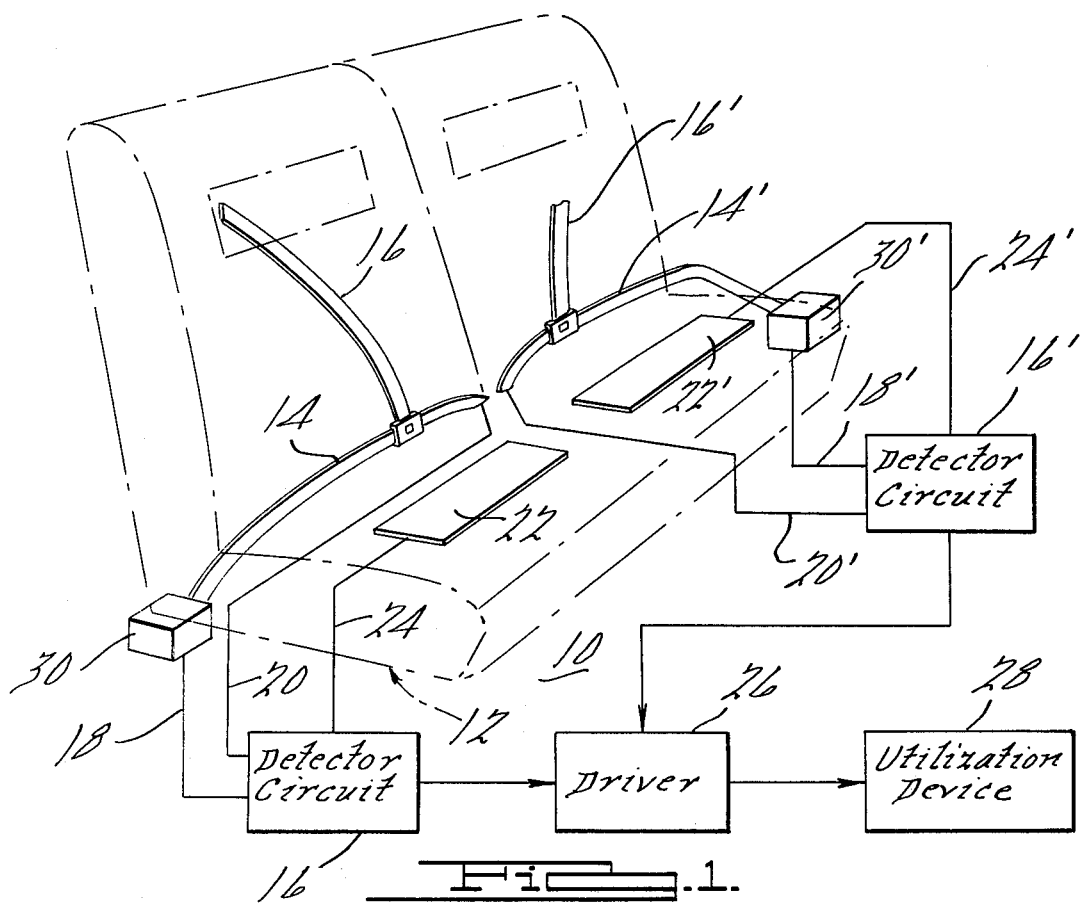
FIG. 1 is an overall view illustrating an exemplary safety belt utilization detecting system according to the present invention in combination with a vehicle seat and a safety belt.

In FIG. 1 a safety belt utilization detecting system 10 is illustrated in operative association with a vehicle seat 12 and safety belts such as lap belts 14 and 14'. The system of the present invention may alternatively be used in conjunction with shoulder belts 16 and 16' or with both the lap belts 14 and 14' and the shoulder belts 16 and 16' in combination. The safety belt utilization detection system 10 includes a detecting circuit 16 which is connected to opposite ends of the safety belt 14 by conductors 18 and 20, a sensing foil 22 which is disposed in the bottom portion of the seat 12 and which is connected to the detector circuit 16 by a conductor 24, an output driver 26, and a utilization device 28 which may be a warning indicator or an ignition/transmission interlock device. The lap belt 14' and/or shoulder belt 16' are associated with a similar detector circuit 16', seat foil 22', conductors 18', 20', and 24', and is connected to the output driver 26 for amplification of its output signal for subsequent use by the utilization device 28. Since the detector circuit 16' and its associated components are the same as the detector circuit 16 and its associated components, only the description of the detector 16 and its associated components will follow. Each of the lap belts 14 is optionally provided with a reel unit 30 and 30' which may include a reel switch (shown in FIG. 2).

Figure 2:
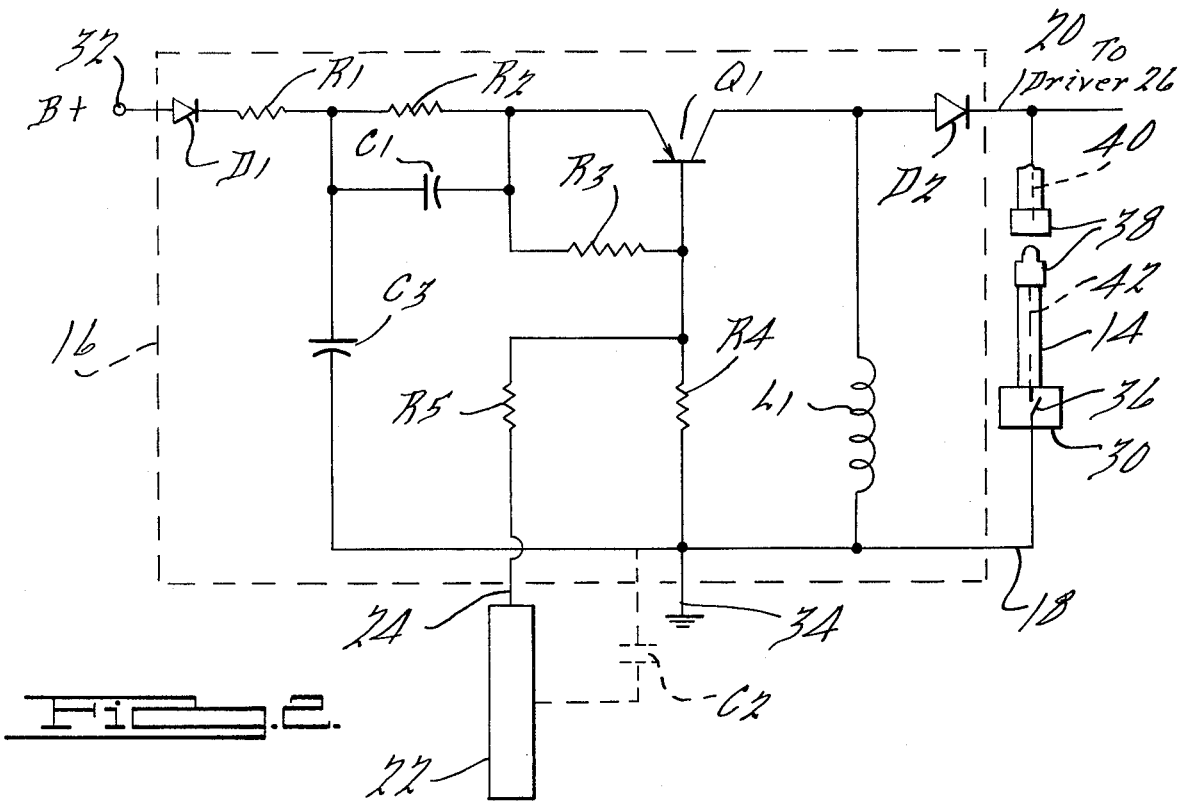
FIG. 2 is a circuit diagram of the detecting circuit of the exemplary safety belt utilization detecting system of FIG. 1.

In FIG. 2, a circuit diagram of an exemplary detector unit 16 is illustrated. The detector unit 16 includes a supply terminal 32 which is connected to the positive terminal of the vehicle battery, the aforementioned conductor 24 which is connected to the foil conductor 22, a connection 34 to the vehicle chassis or the negative battery terminal, the aforementioned conductor 20 which is connected to one end of the lap belt 14, and the aforementioned conductor 18 which is connected to the other end of the lap belt 14 via a switch 36 in the reel unit 30. The switch 36 of the reel unit 30 is closed upon extension of the lap belt 14. The lap belt 14 further includes a buckle and buckle switch 38 which close the current path between conductor portions 40 and 42 which extend along respective parts of the lap belt 14. Optionally, the conductor portions 40 and 42 may extend along one part of the lap belt 14 to be joined at the buckle switch 38 when the belt is buckled.

The detector circuit 16 essentially comprises a transistor oscillator which includes a transistor Q1 as the active element of the oscillator. The emitter of transistor Q1 is connected to the source of positive potential through a diode D1, a supply resistor R1 of high resistance value, and a parallel combination of a resistor R2 and a capacitor C1. The collector of transistor Q1 is connected to ground through an inductor L1 so as to provide a positive-to-negative potential bias across the emitter/collector circuit of the transistor Q1. The base of the transistor Q1 is biased intermediate the positive bias at the emitter of transistor Q1 and ground potential by a resistive divider network comprising resistors R3 and R4. Accordingly, the transistor Q1 is normally biased into a partially conducting state. The base of the transistor Q1 is connected to the seat conductor 22 by a resistor R5. It will be appreciated that the seat conductor 22 forms one plate of a capacitor with the vehicle body forming the other plate of the capacitor so as to provide a capacitive connection to ground potential as illustrated in dashed outlines by capacitor C2. An additional capacitor C3 is connected between the resistors R1 and R2 to ground. The capacitors C1, C2, and C3 provide the necessary elements for establishing an oscillating current through the transistor Q1 under certain conditions to be described.

In the operation of detector circuit 16, prior to the positioning of the occupant in the proximity of the seat conductor 22, the transistor Q1 is partially on so as to provide a non-oscillating current through its emitter/collector circuit which is shunted to ground through the inductor L1. Consequently, the output on line 20 from the output diode D2 is low. When the occupant is positioned in the proximity of the seat conductor 22, the capacitor C2 becomes of greater value due to the interposition of the new dielectric constant of the occupant between the conductor 22 and the vehicle body so as to pull down the potential at the base of the transistor Q1 thereby driving transistor Q1 more fully on. When transistor Q1 is driven more fully on, the potential at the base of the transistor Q1 is pulled down thereby causing a discharge current from the capacitor C3 into the base of transistor Q1 which tends to turn off the transistor Q1. When transistor Q1 turns partly off, the potential at the base of transistor Q1 is increased so as to terminate the current drive into the base of the transistor Q1 from the capacitor C3 to again allow the transistor Q1 to turn on. This action occurs cyclically to cause oscillatory increases and decreases in the current through the transistor Q1. The capacitor C1 has been found to be helpful in sustaining these oscillations. Consequently, so long as the occupant is in the proximity of the seat conductor 22, the transistor Q1 will be in an oscillating condition. It should be noted that the oscillating signal is not shunted to ground through the inductor L1 since the inductor has a value of inductance which presents a relatively high impedance to the oscillating signal. The oscillating signal is coupled through an output diode D2 to provide a "high" output signal on the output of conductor 20 which may be detected by a driver 26 which has a suitable low pass filter and amplifier circuit to indicate that the seat is occupied but the safety belt is not fastened. A suitable detecting circuit can be found in my copending application as identified above.

Oscillation of the transistor Q1 continues until such time that the passenger buckles the seat belt so as to pull down the output on conductor 20 to ground, i.e. to divert or shunt the oscillating energy on the conductor 20 to ground. Upon that occurrence, the signal on conductor 20 goes to a "low" state to indicate that the safety belt has been fastened.

As previously mentioned, the resistor R1 is of very high value so as to minimize the current flow into the detector 16. For example, the resistor R1 may be 33 Kohms so that the current drawn by the detector 16 is less than 4 milliamps. As a result, the detector can be always connected to the battery of the vehicle so that the detector may be used to provide an indication that the seat belt is not buckled even when the ignition is not turned on or so that credit may be given to the buckling of the seat belt prior to such time.

The capacitor C3 not only performs the function of establishing the condition for initiation of oscillation, i.e. to provide a discharge current into the base of transistor Q1 which turns off transistor Q1 after it is turned on due to the position of the occupant in the proximity of the conductor 22, but also serves the function of shunting to ground any high voltage transients that may occur during heavy vehicle electrical loads. For example, an electrical load which often tends to provide harmful transients is the heavy current supplied to the starting motor when the vehicle engine is started. These transients, if not otherwise dealt with by shunting to ground through the capacitor C3, may be harmful to the transistor Q1. It should be noted that prior circuits have used zener diodes for transient protection, however, these diodes tend to draw current at all times. Consequently, an additional drain on the vehicle battery would result if a zener diode were used which would make the circuit less desirable for continual connection to the vehicle battery. In this regard, the capacitor C3 draws no current and yet performs the transient protection function when required.

While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claims.

What is claimed is:

1. In a vehicle for an occupant having an ignition switch and a power supply including a battery, an apparatus comprising:

conductor means positioned to be proximate said occupant when said occupant is in a predetermined relationship with said vehicle;

oscillating means connected to said conductor means for supplying oscillating electrical energy to said conductor means and for supplying an output signal when said occupant is in said predetermined relationship with said vehicle; and input means for said oscillating means connecting said oscillating means to said power supply so that said oscillating means remains connected to said battery when said ignition switch is opened to provide an indication when said occupant is in said predetermined relationship with said vehicle even when said ignition switch is opened, said input means providing a relatively high input impedance to said oscillating means from said supply means for providing sufficient power to said oscillating means for operation of said oscillating means but limiting said power to said oscillating means to a level which allows operation of said oscillating means for long periods of time without excessive drain on said battery.

2. An apparatus according to claim 1 wherein said vehicle includes a seat and wherein said conductor means is associated with said seat.

3. An apparatus according to claim 1 wherein said vehicle includes a safety belt and wherein said conductor means is associated with said safety belt.

4. An apparatus according to claim 1 wherein said input means includes resistor means connected intermediate said oscillating means and said power supply which has a relatively high value of resistance for providing said relatively high input impedance.

5. An apparatus according to claim 1 wherein said conductor means provides a capacitance for said oscillating means and wherein said capacitance is changed from a first value when said occupant is not in said predetermined relationship with said vehicle to a second value when said occupant is in said predetermined relationship with said vehicle with said change in capacitance influencing the oscillation of said oscillating means.

6. An apparatus according to claim 5 wherein said change in capacitance causes said oscillating means to oscillate.

7. An apparatus according to claim 1 wherein said oscillating means includes a transistor and bias means for said transistor for biasing said transistor partly on when said occupant is not in said predetermined relationship with said vehicle, and wherein said conductor means provides a capacitance for said bias means which changes from a first value of capacitance when said occupant is not in said predetermined relationship with said vehicle to a second value when said occupant is in said predetermined relationship with said vehicle for causing said transistor to oscillate.

8. An apparatus according to claim 1 wherein said input impedance is at least approximately 33 Kohms.

9. An apparatus according to claim 1 wherein said input means provides a sufficiently high input impedance so that said power provided to said oscillating means is less than about 4 milliamps.

10. An apparatus according to claim 9 wherein said input impedance is at least approximately 33 Kohms.

11. In a vehicle for an occupant having an ignition switch and a power supply including a battery, an apparatus, comprising:
   conductor means positioned to be proximate said occupant when said occupant is in a predetermined relationship with said vehicle;
   oscillating means connected to said conductor means for supplying oscillating electrical energy to said conductor means and for supplying an output signal when said occupant is in said predetermined relationship with said vehicle; and
   input means for said oscillating means including capacitor means for protecting said oscillating means from current or potential transients from said power supply being connected to receive and dissipate said transients, said input means further including impedance means connecting said oscillating means to said power supply so that said oscillating means remains connected to said battery when said ignition switch is opened to provide an indication when said occupant is in said predetermined relationship with said vehicle even when said ignition switch is opened, said impedance means providing a relatively high input impedance to said oscillating means from said supply means for providing sufficient power to said oscillating means for operation of said oscillating means but limiting said power to said oscillating means to a level which allows operation of said oscillating means for long periods of time without excessive drain on said battery.

12. An apparatus according to claim 11 wherein said vehicle includes a seat and wherein said conductor means is associated with said seat.

13. An apparatus according to claim 11 wherein said vehicle includes a safety belt and wherein said conductor means is associated with said safety belt.

14. An apparatus according to claim 11 wherein said vehicle has ground means providing a ground potential and wherein said capacitor means is connected between said power supply and said ground means.

15. An apparatus according to claim 11 wherein said input impedance is at least approximately 33 Kohms.

16. An apparatus according to claim 11 wherein said input means provides a sufficiently high input impedance so that said power provided to said oscillating means is less than about 4 milliamps.

17. An apparatus according to claim 16 wherein said input impedance is at least approximately 33 Kohms.

18. In a vehicle for an occupant having safety belt means adapted to be secured for restraining said occupant, an apparatus comprising
   first conductor means positioned to be proximate said occupant when said occupant is in a predetermined relationship with said vehicle;
   oscillating means connected to said first conductor means for providing oscillating electrical energy when said occupant is in said predetermined relationship with said vehicle;
   output means for receiving at least a portion of said oscillating electrical energy and being responsive to said received portion of said oscillating electrical energy for supplying an output signal indicating said occupant is in said predetermined relationship with said vehicle; and
   second conductor means associated with said safety belt means for diverting said oscillating electrical energy away from said output means when said safety belt means is secured for restraining said occupant to reduce the oscillating electrical energy received by said output means sufficiently to terminate said output signal.

19. An apparatus according to claim 18 wherein said vehicle includes a seat and wherein said first conductor means is associated with said seat.

20. An apparatus according to claim 18 wherein said vehicle includes a safety belt and wherein said second conductor means is associated with said safety belt.

21. An apparatus according to claim 18 wherein said vehicle has a power supply and said oscillating means has input means which includes resistor means connected intermediate said oscillating means and said power supply which has a relatively high value of resistance for providing a relatively high input impedance to said oscillating means.

22. An apparatus according to claim 21 wherein said first conductor means provides a capacitance for said oscillating means and wherein said capacitance is changed from a first value when said occupant is not in said predetermined relationship with said vehicle to a second value when said occupant is in said predetermined relationship with said vehicle with said change in capacitance influencing the oscillation of said oscillating means.

23. An apparatus according to claim 22 wherein said change in capacitance causes said oscillating means to oscillate.

24. An apparatus according to claim 18 wherein said oscillating means includes a transistor and bias means for said transistor for biasing said transistor partly on when said occupant is not in said predetermined relationship with said vehicle, and wherein said conductor means provides a capacitance for said bias means which changes from a first value of capacitance when said occupant is not in said predetermined relationship with said vehicle to a second value when said occupant is in said predetermined relationship with said vehicle for causing said transistor to oscillate.

25. An apparatus according to claim 18 wherein said vehicle includes ground means providing a ground potential and wherein said second conductor is operative to divert said oscillating electrical energy to said ground means when said safety belt means is secured.

26. An apparatus according to claim 12 further including switch means associated with said second conductor means which is closed when said safety belt means is secured.

27. An apparatus according to claim 26 wherein said vehicle includes ground means providing a ground potential and wherein said second conductor means is operative to divert said oscillating electrical energy to said ground means through said switch means when said safety belt means is secured.

* * * * *